United States Patent [19]

Zaun

[11] Patent Number: 5,083,630
[45] Date of Patent: Jan. 28, 1992

[54] SPRAYER WITH HYDRAULICALLY ADJUSTABLE WHEEL SPACING

[75] Inventor: Richard D. Zaun, Des Moines, Iowa

[73] Assignee: Deere & Company, Moline, Ill.

[21] Appl. No.: 607,012

[22] Filed: Oct. 30, 1990

[51] Int. Cl.$^5$ .................... B62D 61/00; B60K 17/00
[52] U.S. Cl. ..................................... 180/209; 180/340
[58] Field of Search ............... 180/209, 340; 280/42; 301/128; 239/172, 163–168

[56] References Cited

U.S. PATENT DOCUMENTS

| | | | |
|---|---|---|---|
| 3,000,673 | 9/1961 | Lansing | 180/340 |
| 3,156,316 | 11/1964 | Peterson | 180/340 |
| 3,820,615 | 6/1974 | Bobard | 180/340 |
| 3,964,565 | 6/1976 | Cagle et al. | 180/340 |
| 4,619,340 | 10/1986 | Elmer et al. | 180/209 |

OTHER PUBLICATIONS

John Deere 6000 Hi-Cycle® Operator's Manual (OM-N159517), p. 13, Nov. 1979.

Primary Examiner—Charles A. Marmor
Assistant Examiner—Tamara L. Finlay

[57] ABSTRACT

A self-propelled chemical applicator with adjustable rear wheel tread includes two rear fore-and-aft spaced cross tubes which are cantilevered from the main frame. A pair of roller mechanisms are supported between the tubes on opposite sides of the centerline of the vehicle. Each mechanism includes a roller frame supporting eight rollers, two transversely spaced on each of the upper and lower sides of each tube. The roller frames, contained between and rollable along the tubes, are connected to the upper ends of corresponding drop assemblies which mount hydraulically driven wheels. A transversely extending hydraulic cylinder is connected between each roller frame and the main frame to roll the drop assembly in or out to change wheel spacing. Each drop assembly is releasibly clamped in position by a simple mechanism which includes a fore-and-aft extending bolt which pulls the spaced cross tubes towards each other to clamp the roller frame tightly between the tubes.

19 Claims, 2 Drawing Sheets

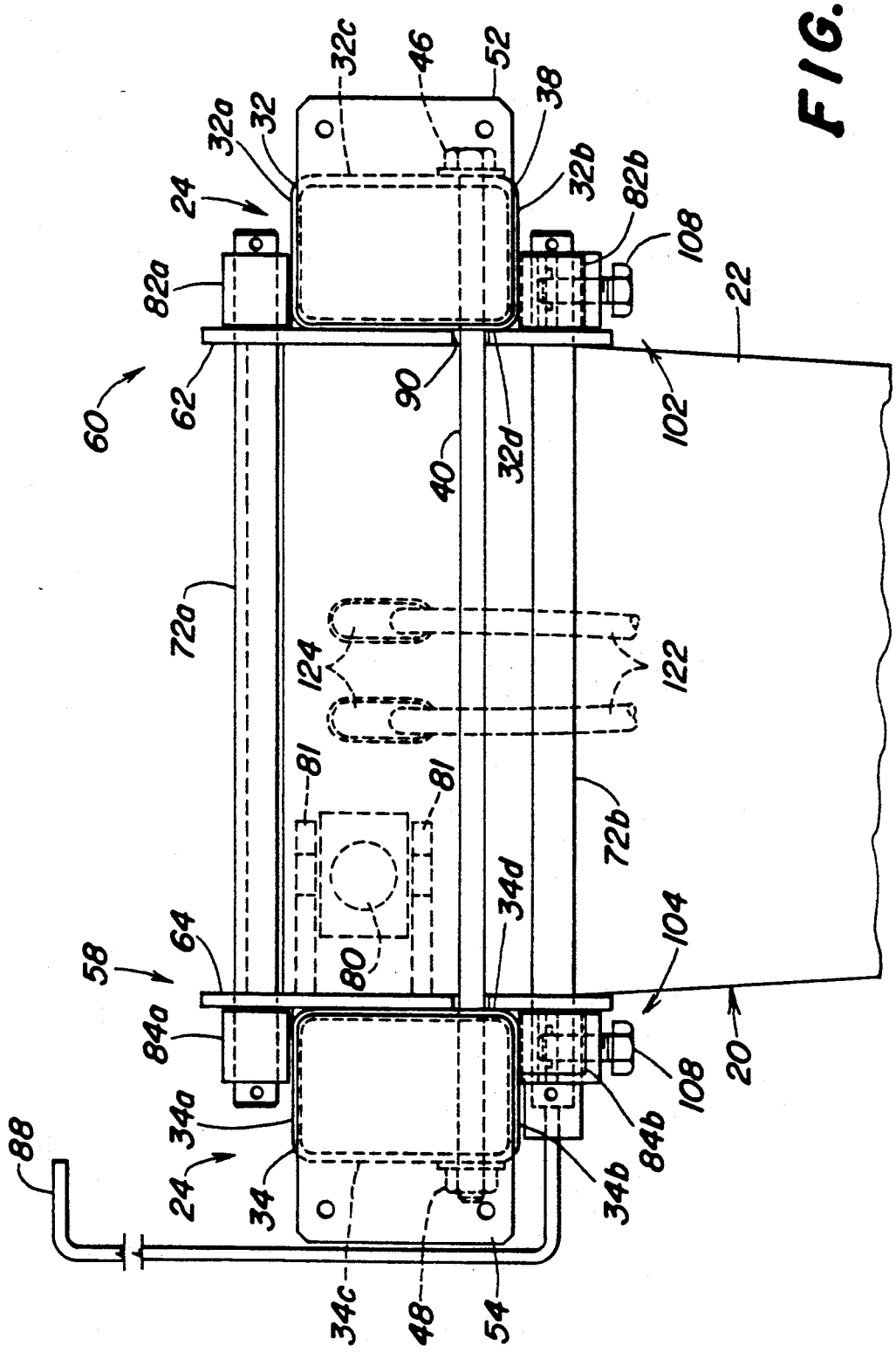

SPRAYER WITH HYDRAULICALLY ADJUSTABLE WHEEL SPACING

BACKGROUND OF THE INVENTION

1. Field of the Invention

The present invention relates generally to agricultural implements with adjustable wheel spacing and, more specifically, to a self-propelled chemical applicator having hydraulically adjustable rear wheel spacing for accommodating different row widths and patterns.

2. Related Art

Presently available self-propelled sprayers such as the John Deere Model 6000 Hi-Cycle Sprayer have a frame supported a substantial distance above the ground on a forward steerable wheel and on drive wheels supported by a pair of rear drop assemblies. The drop assemblies are attached to a transverse rear cross axle tube and are adjustable so that the tires run between rows of plants. The wheel tread therefore depends upon the row spacing and must accommodate many different row spacings and patterns including skip row patterns. Adjusting row spacing on the current 6000 Hi-Cycle Sprayer is relatively time-consuming and requires lifting of the wheel, removing eight bolts and nuts, prying the drop axle to the desired location on the cross tube so that bolt holes align, and thereafter installing and tightening the eight bolts and nuts.

Power-operated devices such as a threaded drive shaft shown in U.S. Pat. No. 4,350,222 have been proposed to decrease the time and effort required to adjust wheel tread on a sprayer. However, such threaded drive devices are subject to binding in the harsh environmental conditions encountered by an agricultural sprayer. In addition, most previously available devices including those on the 6000 Hi-Cycle and on the device shown in the aforementioned U.S. patent include slide structures which connect the drop assembly to the rear cross axle tube or rail structure and present friction and freezing problems, particularly since rusting is a very common problem on chemical applicators.

Any movement between the drop assembly and the cross axle tube during field operations can result in plant damage as a wheel runs too closely to or directly on a row of plants. Therefore, the clamping arrangement must effectively secure the drop assembly against transverse movement.

BRIEF SUMMARY OF THE INVENTION

It is therefore an object of the present invention to provide an improved self-propelled chemical applicator having adjustable wheel tread. It is another object to provide such an applicator which overcomes the aforementioned problems.

It is further object to provide an improved self-propelled chemical applicator with adjustable wheel tread wherein the time and effort required to change wheel spacing for different row widths is significantly reduced as compared with at least most previously available applicators. It is yet another object to provide such an applicator with adjustable spacing drop assemblies supported on a cross tube or rail assembly wherein friction and binding problems are reduced without sacrificing good clamping action.

It is yet another object of the present invention to provide an improved adjustable connecting arrangement between the drop assemblies and the cross tube or rail assembly on a self-propelled chemical applicator, wherein the connecting arrangement assures easy, non-binding drop assembly relocation for accommodating different row spacings. It is yet another object to provide a reliable and quickly operable clamping structure for selectively clamping and releasing the drop assemblies relative to the tube or rail.

In accordance with the above objects, a self-propelled chemical applicator includes two rear fore-and-aft spaced cross tubes with a pair of roller mechanisms supported between the tubes. Each mechanism includes eight rollers, two transversely spaced on each of the upper and lower sides of each tube, by a roller frame. The roller frames, contained between and rollable on the tubes, are connected to the upper ends of corresponding drop assemblies. A transversely extending hydraulic cylinder is connected between each roller frame and the applicator frame to roll the drop assembly in or out to change wheel spacing. Each drop assembly is releasibly clamped in position by a simple clamping mechanism which includes a fore-and-aft extending bolt which pulls the spaced cross tubes towards each other to clamp the roller frame tightly between the tubes.

The roller mechanism overcomes a substantial amount of friction that is associated with conventional sliding arrangements. Problems of freezing caused by rust and corrosion are substantially eliminated with the simple roller mechanism, and wheel tread adjustment can be made quickly and easily. The clamping mechanism reliably and firmly holds the selected wheel tread adjustment and facilitates release when readjustment of wheel tread is necessary for different row spacings. A hydraulic motor on each drop assembly, connected by flexible hoses to the source, facilitates tread adjustment without need to disconnect drive.

These and other objects, features and advantages of the present invention will become apparent to one skilled in the art upon reading the following detailed description in view of the drawings.

BRIEF DESCRIPTION OF THE DRAWINGS

FIG. 3 is an end view of the upper portion of the variable tread structure of FIG. 2.

DETAILED DESCRIPTION OF THE DRAWINGS

Figure 1:
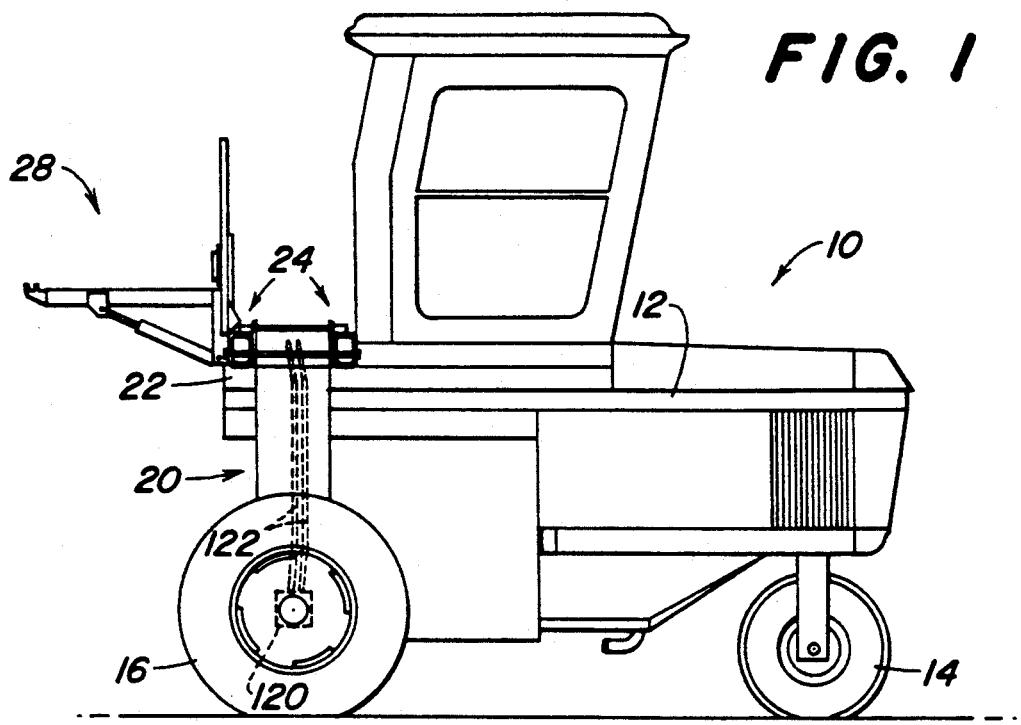
FIG. 1 is a side view of a chemical applicator with the variable tread structure of the present invention.

Referring now to FIG. 1, therein is shown a self-propelled sprayer or chemical applicator 10 having a main frame 12 supported for forward movement over a field with parallel rows of plants by a forward steerable wheel 14 and a pair of transversely spaced drive wheels 16. The drive wheels are carried at the lower ends of a pair of transversely spaced drop assemblies 20 having upper ends 22 firmly supported by tube or rail structure 24 extending transversely in both directions from the rear, central portion of the main frame 12. The drop assemblies 20 extend a substantial distance vertically from the wheels 16 to the tube structure 24 to provide good under-axle crop clearance for working in mature crops. A boom support 28 extends rearwardly from the main frame for carrying a conventional transversely extending boom (not shown) with spray nozzles for dispensing chemicals to the soil and/or crop surfaces.

The forward wheel 14 runs between two adjacent rows of plants, and the rear drive wheels 16 also run between rows of plants. The drop assemblies 20 are transversely adjustable on the tube structure 24 to adjust rear wheel tread to accommodate different row spacings that may be encountered from field to field. The left-hand tube and adjustable drop assembly structure is generally the mirror image of the right-hand structure, and therefore only the right-hand structure will be described in detail.

The tube structure 24 (FIGS. 2 and 3) includes forward and rear tubes 32 and 34, respectively, extending outwardly in generally cantilever fashion from the rear, central portion of the main frame 12. The tubes 32 and 34 extend parallel to each other and have a rectangular cross section with upper surfaces (32a, 34a) and lower surfaces (32b, 34b), as well as outwardly facing walls (32c, 34c) and opposed inwardly facing walls (32d, 34d).

A threaded rod 40 is inserted through one of a plurality of sets of holes 42 in the tubes 32 and 34. A nut 48 is threaded onto the end of the rod 40.

The upper end 22 of the drop assembly 20 is welded to a roller assembly 58. The roller assembly 58 includes a roller frame 60 having fore-and-aft spaced parallel upright plates 62 and 64 fixed to the upper end 22 at the leading and trailing faces of the box-beam structure which makes up the drop assembly 20.

Pairs of upper and lower roller support rods 72a and 72b, respectively, extend through the top and bottom of the plates 62 and 64 and support forward and rear rollers 82a, 82b and 84a, 84b for rotation about fore-and-aft extending axes adjacent the respective upper and lower tube surfaces 32a, 32b and 34a, 34b. The vertical spacing between the rollers is approximately equal to the spacing between the upper and lower surfaces of the beams 32 and 34. The rollers support the roller frame 60 for rolling movement with respect to the beams 32 and 34 and maintain the drop assembly in a preselected attitude relative to the tube structure 24.

The rod end of a hydraulic cylinder 80 is connected to the roller frame 60 and the drop assembly 20 by a bracket 81. The axis of the cylinder 80 is generally parallel to the tubes 32 and 34, and the cylinder is contained between the tubes with its cylinder end connected by a bracket (not shown) to a central portion of the main frame. The right-hand cylinder 80 (shown) is connected near the rear plate 64 (FIG. 3), while the cylinder for the opposite side is connected to the forward plate corresponding to the plate 62 so that the cylinder ends of the cylinders 80 can overlap at the central frame area to provide sufficient stroke length for a relatively large tread adjustment range.

During manufacture and set-up of the sprayer 10, the roller assembly 58 with the drop assembly 20 attached thereto is positioned on the tubes 32 and 34. The rod end of the cylinder 80 is attached to the bracket 81, and the cylinder is connected to a source of hydraulic fluid on the sprayer. Retracting the cylinder 80 causes the roller frame 60 to roll inwardly along the tubes 32 and 34. Extension of the cylinder 80 moves the frame 60 outwardly. A rod-like pointer 88 which is connected to the lower rod 72b (or alternately a strap bolted to the drop assembly 20) extends rearwardly and upwardly from the roller 84b (or the upper end 22) to an upper location which is clearly visible so that drop assembly position can be easily and accurately determined from the operator's station on the vehicle 10. Once in the desired location, the roller assembly 58 is secured against transverse movement by placing the bolt 40 through the set of holes 42 at the outermost area of the roller frame 60 (FIG. 2) and tightening the nut 48 (FIG. 3) to urge the surfaces 32d and 34d of the tubes 32 and 34 tightly against the plates 62 and 64, respectively, of the roller frame 60.

Figure 2:
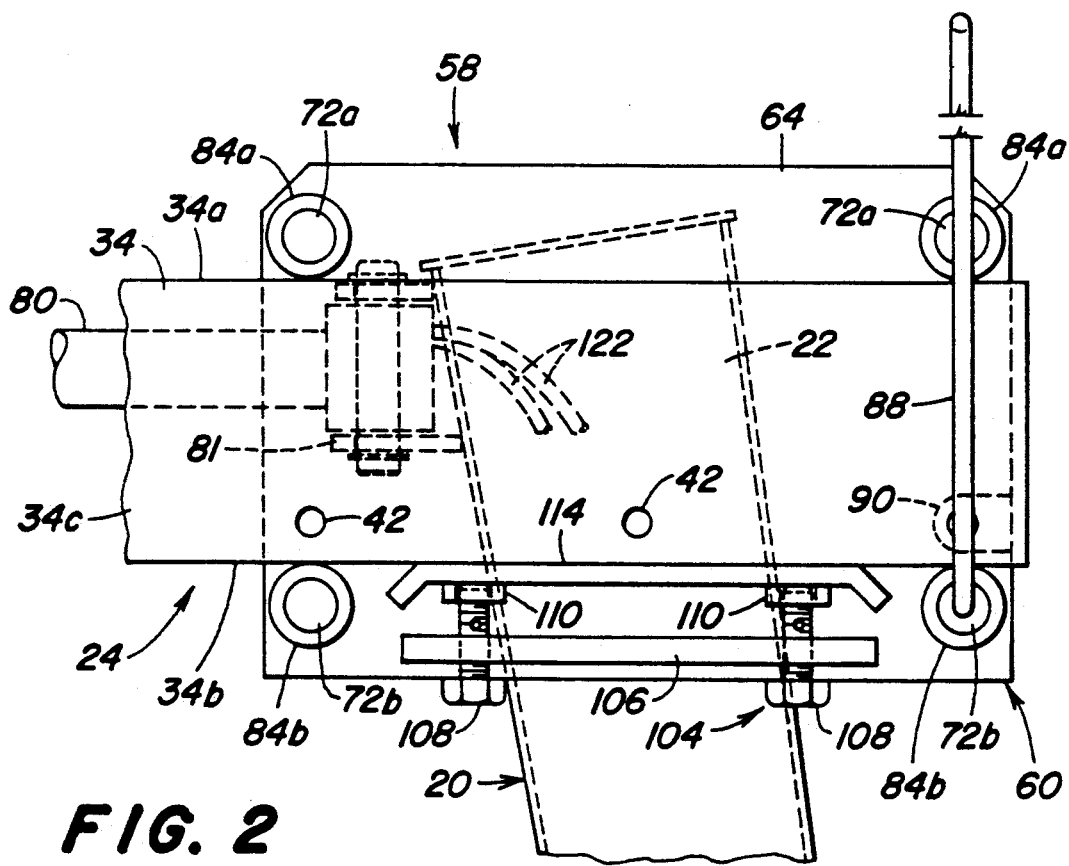
FIG. 2 is an enlarged rear view of the right-hand side of the applicator of FIG. 1 showing the upper portion of the variable tread structure.

As best seen in FIG. 2, the outer sides of the plates 62 and 64 are slotted at 90 to accommodate the bolt 40 inwardly of the corresponding edges of the plates. The apertures 42 in the tubes 32 and 34 are spaced such that for most all conventional wheel tread settings, the bolt 40 may be positioned at the same location relative to the roller frame 60, that is, within the slots 90 in the plates.

For added clamping force to retain the drop assemblies 20 in position on the tubes 32 and 34, each roller assembly 58 includes generally identical clamping assemblies 102 and 104 for selectively engaging the tubes 32 and 34. The assembly 104 (FIG. 2) includes a horizontal strap 106 welded to the outer face of the plate 64 below the tube 24. Bolts 108 extend upwardly through threaded holes in the strap 106 and are rotatably received within bushings 110 secured to the bottom of a camming or slide member 114. During adjustment of the wheel tread, the bolt 40 is removed as noted above, and the bolts 108 of the assemblies 102 and 104 are unthreaded relative to the strap 106 a sufficient distance so that the members 114 are generally out of contact with the lower surfaces 34b and 32b of the tube 34 and 32. As the cylinder 80 is extended or retracted while the sprayer 10 is moved slowly in the forward or backward direction, the roller frame 60 rolls relatively freely on the tubes 32 and 34. After the roller frame 60 is properly positioned at the desired location, the bolts 108 are rotated to move the members 114 against the lower surfaces 32a and 34a of the tubes and draw the upper rollers 82a and 84a firmly against the upper surfaces 32a and 34a. The bolt 40 is inserted in the holes 42 which are aligned with the slots 90, and the nut 48 is tightened to urge the inner surfaces 32d and 34d of the tubes against the plates 62 and 64 of the roller frame 60. The clamping structures 40, 48 and 102 and 104 prevent transverse movement of the drop assemblies 20 for constant wheel tread without looseness. The rollers 82a and 82b are transversely spaced (FIG. 2) on either side of the upper end 22 of the drop assembly 20 a sufficient distance to provide good leveraged support both for ease of rolling during adjustments and for stability and strength during field operations and transport.

A hydraulic motor 120 (FIG. 1) is supported at the lower end of each of the drop assemblies 20 and is drivingly connected to the corresponding wheel 16. Hydraulic hoses 122 are routed upwardly from the motor 120 through the center of the drop assembly 20 and inwardly through slots 124 on the inside wall of the upper portion 22 of the drop assembly. The hoses 122, which extend inwardly between the tubes 32 and 34 along side of the cylinder 80, are connected to the source of hydraulic fluid under pressure on the sprayer 10 and are flexible to facilitate tread adjustment.

Having described the preferred embodiment, it will become apparent that various modifications can be made without departing from the scope of the invention as defined in the accompanying claims.

I claim:

1. In a self-propelled chemical applicator having a pair of transversely spaced ground wheels, and a frame adapted for forward movement over the ground in fields planted in parallel rows of plants, the spacing of the rows varying from field to field, variable tread structure comprising:
- a transversely extending tube structure connected to the frame and having outer surfaces;
- a roller assembly including a roller frame, a plurality of rollers connected to the roller frame and carried by the outer surfaces of the tube structure for transverse rolling movement of the roller assembly along the outer surfaces;
- an upright drop assembly having an upper end fixed to the roller frame for support thereby on the tube structure in a preselected attitude relative to the tube structure, and a lower end rotatably mounting one of the ground wheels, wherein at least one or more of the rollers normally provides support for the drop assembly during forward movement of the applicator in the field; and
- an extendible and retractable hydraulic cylinder connected to the roller frame for moving the roller frame along the tube structure to thereby adjust tread width to accommodate the varying row widths.

2. The invention as set forth in claim 1 wherein the tube structure comprises first and second spaced and generally parallel tubes having opposed inwardly facing surfaces and wherein the roller frame is supported between the tubes and includes outwardly facing surfaces located closely adjacent the respective inwardly facing surfaces.

3. The invention as set forth in claim 2 wherein the roller frame is elongated in a direction parallel to the axis of the tubes and the plurality of rollers includes first and second sets of rollers and means for supporting the rollers adjacent the ends of the roller frame with the rollers extending outwardly on opposite sides of the first and second tubes.

4. The invention as set forth in claim 2 including means for releasibly clamping the roller frame relative to the tube structure for maintaining desired wheel tread, wherein the means for releasibly clamping includes means for urging the parallel tubes towards each other to clamp the inwardly facing surfaces of the tubes against the outwardly facing surfaces of the roller frame.

5. The invention as set forth in claim 4 wherein the means for urging comprises a bolt member extending between and connected to the parallel tubes adjacent the outer end of the roller frame.

6. The invention as set forth in claim 2 wherein the tubes are spaced in the fore-and-aft direction, and the rollers include upper and lower sets of rollers extending in the fore-and-aft direction from the roller frame adjacent the upper and lower surfaces of the tubes.

7. The invention as set forth in claim 4 wherein the means for clamping the roller frame includes means for urging a plurality of the rollers against one or more of the surfaces of the tubes.

8. The invention as set forth in claim 6 including means for selectively urging the tubes towards each other to tightly sandwich the roller frame between the tubes.

9. The invention as set forth in claim 8 further including camming means for urging the upper rollers downwardly against the upper surfaces of the tubes.

10. In a self-propelled chemical applicator having a pair of transversely spaced ground wheels, and a frame adapted for forward movement over the ground in fields planted in parallel rows of plants, the spacing of the rows varying from field to field, variable tread structure comprising:
- a transversely extending tube structure connected to the frame and including front and rear spaced tubes extending outwardly from the frame in cantilever fashion, the tubes extending substantially parallel to each other, the tubes having outer surfaces including a lower surface and an upper surface;
- a roller assembly including a roller frame having outwardly facing surfaces, forwardly and rearwardly extending rollers connected to the roller frame in rolling contact with the lower surfaces of the front and rear tubes, respectively, for transverse movement of the roller assembly along the tube structure;
- an upright drop assembly having an upper end fixed to the roller frame for support thereby on the tube structure in a preselected attitude relative to the tube structure, and a lower end rotatably mounting one of the ground wheels;
- wherein the rollers include outermost rollers extending a substantial distance on either side of the transverse extremities of the upper end of the drop assembly and supported for contact with the outer surfaces of the front and rear tubes;
- an extendible and retractable hydraulic cylinder connected to the roller frame for moving the roller frame along the tube structure to thereby adjust tread width to accommodate the varying rows widths; and
- means for releasibly securing the roller frame relative to the tube structure for maintaining desired wheel tread.

11. The invention as set forth in claim 10 wherein the means for releasibly securing includes means for urging the front and rear tubes towards each other.

12. The invention as set forth in claim 10 wherein the hydraulic cylinder extends between and is generally parallel to the tubes.

13. The invention as set forth in claim 10 further including upper rollers supported for rolling contact with the upper surfaces of the front and rear tubes.

14. The invention as set forth in claim 10 wherein the rollers include outermost rollers extending a substantial distance on either side of the transverse extremities of the upper end of the drop assembly.

15. The invention as set forth in claim 14 further including upper rollers in rolling contact with the upper surfaces of the tubes, wherein a plurality of the rollers provide a substantial portion of the drop assembly support during field-working operations.

16. The invention as set forth in claim 15, further including an adjustable camming member for selectively urging the upper rollers firmly into contact with the upper surfaces of the tubes during field-working operations.

17. In a self-propelled chemical applicator having a pair of transversely spaced ground wheels, and a frame adapted for forward movement over the ground in fields planted in parallel rows of plants, the spacing of the rows varying from field to field, variable tread structure comprising:
- a transversely extending tube structure connected to the frame and including front and rear spaced tubes extending outwardly from the frame in cantilever fashion, the tubes extending substantially parallel to each other;

a roller assembly including a roller frame having outwardly facing surfaces, forwardly and rearwardly extending rollers connected to the roller frame in rolling contact with the lower surfaces of the front and rear tubes, respectively, for transverse movement of the roller assembly along the tube structure, the rollers including upper rollers supported for rolling contact with an upper surface of the front and rear tubes;

an upright drop assembly having an upper end fixed to the roller frame for support thereby on the tube structure in a preselected attitude relative to the tube structure, and a lower end rotatably mounting one of the ground wheels;

an extendible and retractable hydraulic cylinder connected to the roller frame for moving the roller frame along the tube structure to thereby adjust tread width to accommodate the varying row widths;

means for releasibly securing the roller frame relative to the tube structure for maintaining desired wheel treads; and wherein the means for releasibly securing the roller frame includes means for urging a plurality of the rollers against the surfaces of the front and rear tubes including an adjustable camming surface engageable with the tubes.

18. In a self-propelled chemical applicator having a pair of transversely spaced ground wheels, and a frame adapted for forward movement over the ground in fields planted in parallel rows of plants, the spacing of the rows varying from field to field, variable tread structure comprising:

a transversely extending tube structure connected to the frame and including front and rear spaced tubes extending outwardly from the frame in cantilever fashion, the tubes extending substantially parallel to each other;

a roller assembly including a roller frame having outwardly facing surfaces, forwardly and rearwardly extending rollers connected to the roller frame in rolling contact with the lower surfaces of the front and rear tubes, respectively, for transverse movement of the roller assembly along the tube structure;

an upright drop assembly having an upper end fixed to the roller frame for support thereby on the tube structure in a preselected attitude relative to the tube structure, and a lower end rotatably mounting one of the ground wheels;

an extendible and retractable hydraulic cylinder connected to the roller frame for moving the roller frame along the tube structure to thereby adjust tread width to accommodate the varying row widths;

means for releasibly securing the roller frame relative to the tube structure for maintaining desired wheel tread; and wherein the said one of the ground wheels ground wheel comprises a driven wheel, and further comprising a hydraulic motor supported at the lower end of the drop assembly and drivingly connected to the driven wheel.

19. The invention as set forth in claim 18 wherein the drop assembly comprises a hollow box structure having an apertured inner wall, and further including flexible hose structure extending upwardly through the box structure and inwardly through the apertured wall for connecting the motor to a source of hydraulic fluid under pressure on the applicator and facilitating transverse adjustment of the drop assembly without disconnection of the motor from the source.

* * * * *